United States Patent

[11] 3,619,428

[72] Inventor Constant V. David
2625 Loring St., San Diego, Calif. 92109
[21] Appl. No. 719,069
[22] Filed Apr. 5, 1968
[45] Patented Nov. 9, 1971

[54] POROUS PARTICLE FABRICATION PROCESS
13 Claims, 4 Drawing Figs.
[52] U.S. Cl. .................................................. 264/0.5,
264/44
[51] Int. Cl. ................................................. G21c 21/00
[50] Field of Search .......................................... 264/15, 43,
44, 0.5; 176/91 SP

[56] References Cited
UNITED STATES PATENTS
3,084,394 4/1963 Bickerdike et al............ 264/44 X
3,179,722 4/1965 Shoemaker.................. 264/15 X
3,179,723 4/1965 Goeddel...................... 264/15 X
3,270,098 8/1966 Barr et al..................... 264/0.5

*Primary Examiner*—Benjamin R. Padgett
*Assistant Examiner*—S. R. Hellman
*Attorney*—Carl R. Brown ABSTRACT: The method of fabricating spheroid-shaped particles of porous carbon with metal or metallic compound powder dispersed therein, which particles have controlled size, shape and porosity, by dispersing powdered metal or metallic compound material that may comprise fissionable material in precured resin particles, heating the particles in a suspended condition in a fluid medium to spherically shape and cure the particles and then pyrolyzing the cured particles to produce the spheroid-shaped porous char matrix binding the metal or metallic compound powder together.

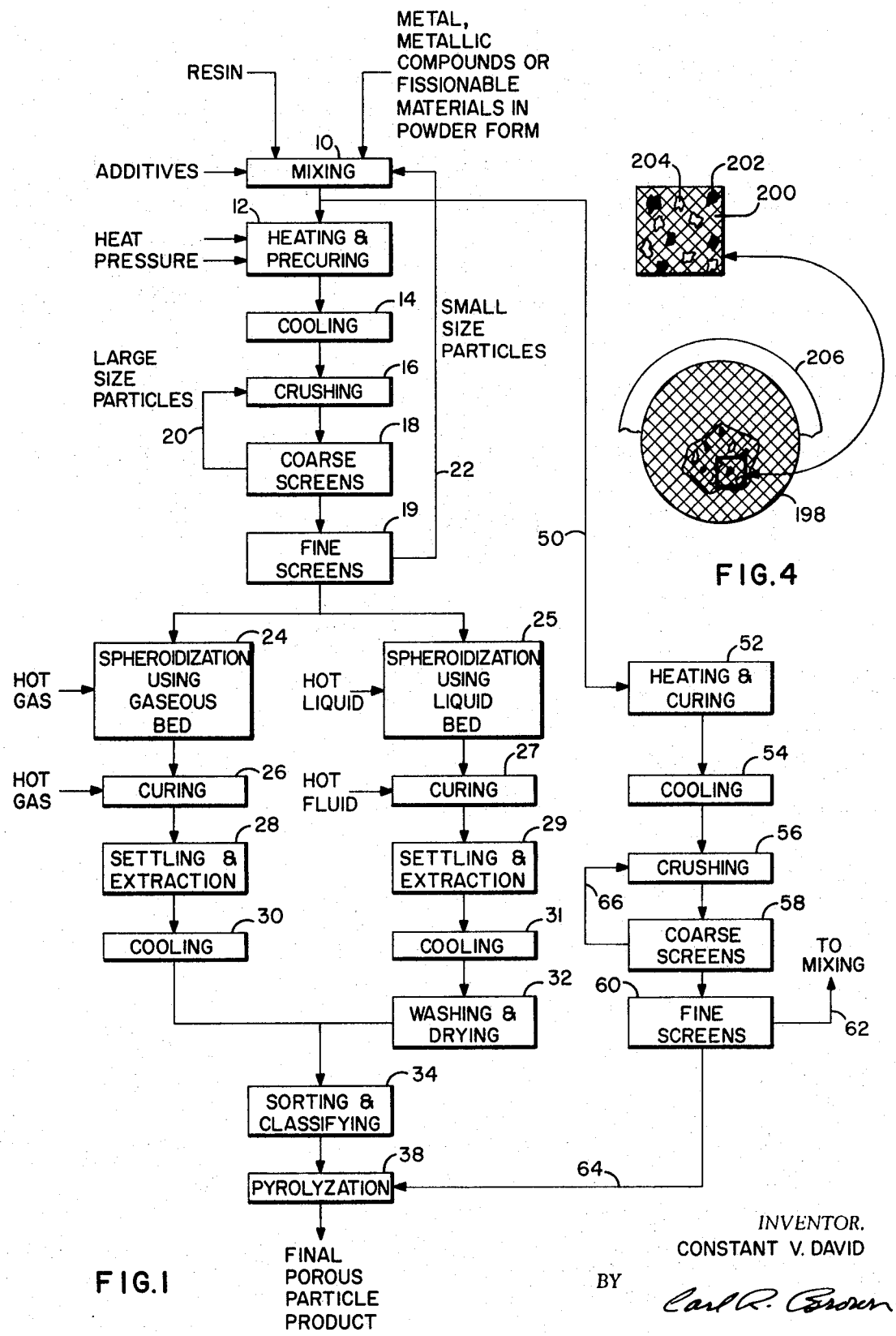

INVENTOR.
CONSTANT V. DAVID

BY Carl R. Brown

ATTORNEY

POROUS PARTICLE FABRICATION PROCESS

BACKGROUND OF THE INVENTION

The technology of nuclear reactors is well known and is based on the use of fissionable elements such as Uranium, Thorium and/or Plutonium, separately or mixed and sometimes dispersed in a graphite matrix structure called a fuel element. During the life of the nuclear reactor, the fission of the heavy fissionable atoms causes a volume increase due to the generation of gaseous fission products. The fuel element graphite matrix is porous and these gaseous fission products could escape and mix with the reactor cooling fluid, which is undesirable, unless a gastight barrier is provided between the fissionable materials and the cooling fluid. Furthermore, voids must also be provided around the fissionable material within this gastight barrier; otherwise the release of the gaseous fission products and the swelling of the fuel material would create very high pressures that could not be contained by the structure of the fuel elements.

There is a known particle structure concept for coating a particle of fissionable material with a gas storing buffer and a gastight shell. This concept is generally known as the coated particle concept for fuel elements of gas cooled nuclear reactors. In this concept the fissionable material, such as a carbide of the heavy fissionable elements enumerated above, comprises a solid spherical particle having a diameter ranging from 20 microns to 500 microns, as deemed most desirable for the coating operation. The center particle is coated with a distended (density less the theoretical, porous) graphite (or carbon) layer called the buffer. The buffer layer thickness may range from a fraction of the particle radius to more than the particle radius. This layer may have between 20 to 60 percent voids and is relatively soft in the sense that it can be crushed if and when the center particle expands. This buffer layer is in turn coated with another layer of dense, highly laminated (oriented) pyrolytic carbon layer that exhibits high strength in the circumferential direction and gas tightness in the radial direction to function properly as a gastight pressure vessel.

The shell coating thickness can vary between a fraction of the partial radius to more than this value. As the nuclear reactor keeps operating, the expansion of the particle crushes part of the buffer layer against the shell and in principle enough void volume can still be available for storage of the gaseous fission products under pressure, contained by the shell so that the shell does not crack under the circumferential tension stresses developed and limits the amount of stresses transmitted to the matrix which holds the coated particles together.

In the coated particle concept, the coating of the particles consists of two layers. The outer layer (shell) is easily applied, using standard carbon coating techniques such as levitation in an ascending stream of a hot hydrocarbonaceous gas such as methane. The inner layer (buffer) is much more difficult and costly to apply. Furthermore, the degree of distension and the crushing strength desired as being optimum cannot always be obtained. In addition, each coating layer thickness varies from particle to particle in the same coating batch around the mean value specified. Since the two layers are applied sequentially, the two tolerance spreads compound and the tolerances on the overall coating thickness are consequently very wide, which degrades the particle performance as based on the ideal mean specified value.

For these reasons, redesign of the basic coated particle concept has been attempted so that the inner layer coating (buffer) can be eliminated altogether. Since voids must still be provided for the expansion of the fissionable materials and the storage of the gaseous fission products, the inner particle must be porous and in such a way that when the solid material in it expands, this expansion can take place at the expense of the pores (voids). For instance, unless the particle melts, a central hole in the particle would not keep the particle outer diameter from increasing. Accordingly, it is necessary to disperse the solid particle, broken up into a fine dust or powder into a porous graphitic matrix to replace the buffer-coated-solid-particle. Such a spherical porous particle then requires only one coating, the shell layer. As long as the carbon, fissionable material and void contents of this new porous particle are similar to that of the buffer-coated-particle previously described, it will perform the same in the nuclear reactor, and the undesirable layer is eliminated.

In order to operate efficiently, the porous particle must be spherical, to minimize the shell thickness for a specified peak pressure applied internally at the end of the fuel element life period. The fabrication of such a porous particle should therefore lead to spherical particles, prior to the shell coating operation. There are two known processes for accomplishing this. They are the Sol-gel process and the conglomeration of powdered fissionable material and carbon in a charred resin binder process.

The Sol-gel process that is well known in physico-chemistry, leads to crystallites of carbides of the fissionable metals or metallic compounds dispersed in a graphite porous matrix. The metal content, the graphite matrix bulk density and the strength of that matrix material obtained by this process are not easy to obtain as required. Furthermore, the fissionable metals or metallic compounds can only be obtained in the form of a carbide compound. Other refractory compounds of fissionable metals such as borides or beryllides that offer additional advantages cannot be used. Thus this process lacks the flexibility of parameter variation required to optimize the porous particle. The other known fabrication process is based on the use of a mixture of fissionable material powder, carbon dust and a binder such as furfural phenol, that upon curing and pyrolyzation produces the graphite char matrix desired. The graphite matrix so fabricated is not very strong and the porous particles obtained this way must still be spheroidized mechanically.

SUMMARY OF THE INVENTION

The porous particle fabrication process of this invention generally comprises the method of fabricating shaped particles of porous material with a metal or metallic compound powder including fissionable elements dispersed therein and which particles have a controlled size, shape and porosity. The process is particularly applicable for dispersing particles of fissionable material such as Uranium, Thorium and/or Plutonium, or other suitable materials in a porous graphite particle that upon the completion of the process may be provided with a gas sealing shell. The end particle product is preferably spheroid to allow the shell coating to be applied to the particle so that it has a uniform thickness. This latter structure has particular end application as a nuclear reactor fuel.

In employing the processes, the metallic compounds or metal powder is mixed with a filler material, as for example carbon in the form of small flakes or chopped fibers, and with a resin that is capable of being pyrolyzed to provide a suitable char or graphite binder that has the desired porous composition. The resin, powder and additives are mixed together with the powder having a particular small size that is sufficiently small, relative to the final size porous particles, to provide suitable dispersion of the powder in the final particle product. The mixed composition is then heated and precured and is then cooled to a solid form. The solid composition is crushed to a particle size that determines the size of the end porous particle. The crushed particles or grits are sorted by known screening techniques to obtain the desired sized particles, with large size particles being returned to be recrushed in the crushing step and the smaller size particles, if desired, being returned to the mixing step to increase the operation yield. The desired size particles have a rather ununiform shape that generally resembles gravel. Where it is desired that the end particle have this sort of shape, then the particles at this point can be directly moved to the step of pyrolyzing where the odd shaped particles are raised to a sufficient temperature that the resin is charred. However, for most applications it is desirable, and it is a feature of this invention to provide an end particle having a spheroid shape. Thus the sized particles or grit in the precured state are supplied to a heated environment that may comprise a gas or liquid bed, where the particles are immersed in the fluid that is heated to the temperature required to melt the resin in the particles and also to cure the resin. The particles are sufficiently dispersed in the fluid so as not to contact and join other particles and by being suspended in the fluid in a melted state are subjected to surface tension forces that causes the particles to assume a spherical shape. Thus in this step, the heated fluid bed functions to spheroidize the particles and also to cure the particles.

Where the particles are inserted into a gaseous fluid bed, then the output particles are cooled and directly sorted and classified for the pyrolyzation step. However, where a liquid bed is employed, the extracted particles are passed through a solvent bed that removes the liquid of the liquid bed. The particles are then cooled, sorted, classified and transported in a known manner to an oven having a temperature sufficiently high to char the resin.

Thus it may be seen that the process of this invention allows the exact proportion of each component of the porous end particles to be easily controlled and obtained. Further the chemical compound form of the fissionable material or other metals or metallic compounds dispersed in the porous particle is not limitative so long as it can be reduced to a powder form having a sufficiently small size. The addition of beneficial components to the basic mixture is made easy and controllable where it is desired to add additives that may improve the final charred product or aid in the process. The spheroidization of the particles occurs automatically without enlarging the final product or obtaining varying shapes, since it is based upon surface tension action. Also the use of fluid beds to obtain the spheroidization of the particles allow the use of fluid levitation processes to obtain an even distribution of the particles and thus avoid agglomeration as well as obtaining sufficient time in the heated environment to cure the resin. The process further allows easy recycling of particles to obtain optimum and controlled size and curing.

Therefore it is an object of the present invention to provide a new and improved fabrication process for fabricating porous particles.

It is another object of this invention to provide a new and improved porous particle fabrication process in which the exact proportion of each of the components of the porous particles can be easily controlled and obtained.

It is another object of this invention to provide a new and improved porous particle fabrication process that may be easily automated.

It is another object of this invention to provide a new and improved porous particle fabrication process that provides spheroid particles that may be charred in a nonagglomerating condition.

Other objects and advantages of this invention will become more apparent upon a reading of the following detailed specification and an examination of the drawings in which:

FIG. 1 is a block diagram of the steps of the fabrication process of this invention.

FIG. 4 is a cross-sectional view of a porous particle fabricated by this process.

Figure 3:
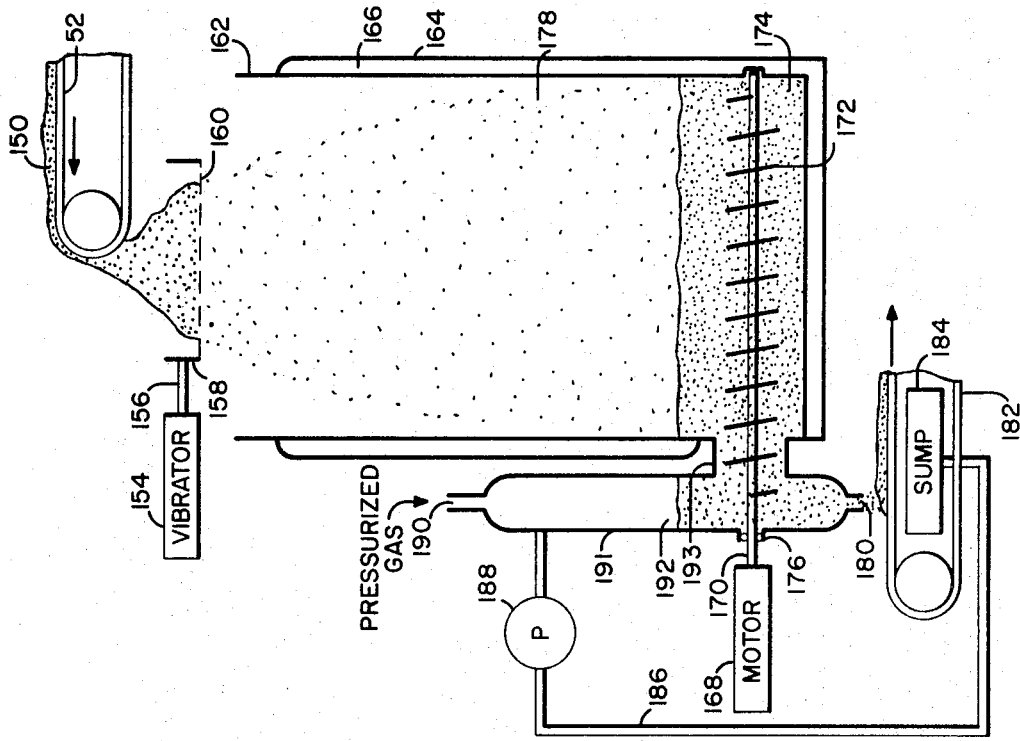
FIG. 3 is a schematic view of a liquid bed curing process apparatus.

Referring now to FIG. 4, the porous particle that is fabricated by this process comprises a spherical-shaped body 198 of graphite matrix material 200 having voids 204 and fissionable material powder 202 dispersed therein. As previously described the spherical-shaped body 198, when used in making a nuclear reactor fuel, is coated with a gastight shell 106. Thus accumulations of gas within the shell that are generated during fission is absorbed by the voids 204 and the porous graphite matrix material 200. While this process is capable of dispersing other metal or metallic compounds in a porous particle, it has particular unique application in the dispersing of fissionable materials for use in fuel elements for nuclear reactors. It should be understood that the cross-sectional illustration in FIG. 4 is enlarged for purposes of illustration.

The three basic constituents that are mixed in the first step of the process comprise the fissionable, metal or metallic compound material in powder form, the additives of filler material and the uncured liquid resin or uncured resin in solid particle form. The metallic compound may comprise any suitable metal compound, such as but not limited to, carbides, borides, beryllides, nitrides, oxides, silicides, or any other suitable metal or metallic compound. This fissionable material may be mixed in any suitable form, such as a chemical compound form including uranium, plutonium, thorium, or any other suitable fissionable material or metals. The metallic compound or metal is introduced into the process in powder form comprising small grains having any particular shape with a size range that generally extends between 0.1 micron and 25 microns. The filler material, that may normally comprise carbon or graphite but is not restricted thereto and may comprise other additives to either improve the nuclear fuel material performance or the char properties or both, is inserted into the mixing step in the form of solid chopped fibers, flakes or as a powder. The filler material is normally used to selectively increase or vary the carbon content of the final particle, to selectively vary the strength of the final product and to provide routes for gases to escape in the pyrolyzing of the resin. The base resin can consist of 1 part, 2 parts, or more as required for curing and good charring characteristics. The uncured resin parts, before mixing can be in liquid form or in solid fine powder form.

Since a relatively dense char is required as matrix material for the porous particles, only resin systems that can pyrolyze from the cured solid state are acceptable for this fabrication process. Resin systems, such as thermoplastics, that melt before pyrolyzation is initiated or foam as gasses are released within the liquid phase cannot be used in this process. The acceptable or suitable resin systems for use in this process belong either to the "addition polymers" type or to the "condensation polymers" type. The addition polymer resin type, typified by epoxy resins, are characterized by cross-linking chemical reactions that do not release volatiles during the curing process. The condensation polymer resin type, such as phenolic base resins, polyimide and polybenzimidazole resins cure in the liquid phase with the release of a large amount of volatiles until the molecule cross-linking process is completed. The pyrolyzation of these cured resins leads to comparatively denser and stronger char structures. The addition polymer resins cure automatically with a rate that is temperature dependent once the two parts have been mixed and the cross-linking reaction has been initiated whereas condensation polymer resins cross-link to a degree that is only a function of the temperature level reached by the resin base.

The mixing step 10, see FIG. 1, can be accomplished by mixing the metal or metallic compound powder with the filler material and then with the resin or by mixing either the metal or metallic compound powder with the resin first and then by adding the filler material, or by mixing the resin with the filler material first and then adding the metal or metallic compound powder. If the resin is in a solid powder form, the metal or metallic compound powder and the filler material can be added together with the resin powder and mixed. Should the resin be in a liquid form, the metal or metallic compound powder and the filler material are added to either one part of the resin or all parts of the resin before the mixing of the parts. The choice of mixing procedure depends upon the volumetric ratio of the resin parts and the viscosity of each part or of the mixed parts, with the choice being made to obtain the most uniform dispersion of the metal or metallic compound and the filler material with the maximum ease. The mixing step 10 can be performed by any of the known mechanical apparatus used in the art for mixing powder, or powders in liquids, with the understanding that some means are preferable to others, depending upon the volumetric ratios of the constituents, the size of the powder grains and the viscosity of the resin parts, if liquid.

The preferred volumetric ratio of the total of the various constituents is between 5 and 50 percent metal or metallic compound powder, between 0 and 40 percent filler material and between 10 and 95 percent resin. A typical mixture has a volumetric ratio of 30 percent metal or metallic compound, 25 percent filler material and 45 percent resin.

Upon completion of the mixing, step 10, the mixture is heated to a temperature and under pressure, if necessary, for that length of time required to precure the resin to a point that it is solid at or below room temperature, but liquid at a temperature above the precuring temperature. The precured solid mixture is then cooled down to a temperature such that the curing process is stopped completely. The precured solid mixture is then crushed into a grit form. The grit is sieved to sort the grit into mesh sizes. The sieve mesh range can vary according to the application but normally extends from a 20 micron size to 200 microns. The grit smaller than the 20 micron size is either thrown away or reprocessed by being reintroduced from the fine screens 19 through representative path 22 into the mixing step 10 and mixed with the filler material and the metal or metallic compound for mixing with the resin. The grit larger than the 200 microns size is screened out by coarse screening 18 and is returned by representative path 20 to be recrushed to bring it to the correct size.

The shape of each individual particle obtained from the sorting steps 18 and 19 is in general irregular and similar to gravel. To shape each individual grain of the grit to be spherical, the grit is heated to a melted condition and is then processed so that the curing of the resin is completed. Since the resin is melted, provisions must be made to keep individual particles of the grit from agglomerating during these steps, and the grit must be maintained at the temperature required to complete the resin curing process. Accordingly, at some time, preferably at the beginning of step 24, the precured resin that is solid at low temperature melts when brought to the elevated temperature needed for the curing. At this point, each individual particle of the grit becomes viscous and deformable under pressure. The surface tension forces generated by the liquid resin within each particle creates an appreciable pressure because of the very small size of these particles. This pressure acts on the particle material in such a way that its surface is minimized, thereby automatically spheroidizing the particle shape and giving it the spherical shape desired. As the curing proceeds, the particle material becomes more and more viscous until it is a solid. At this point, the material has become tack free and will not agglomerate into a solid mass. The curing process can now be completed without the particles agglomerating.

The heating of the particles is accomplished in a manner that they do not touch and remain separated at all times during curing and until they have become solid and tack free. This is accomplished by keeping or suspending the particles for a given period of time in a hot fluid, either a gas or a liquid, maintained at or above the curing temperature. The residence time at this temperature must be as long as needed to reach the tack free point and is accomplished by use of gaseous or liquid beds that are discussed separately hereinafter.

GASEOUS BED

If the number of particles in a given volume is small, that is a large mean separation distance between particles compared to the mean particle dimension, the probability of contact and agglomeration occurring will be low and the yield of the operation will be high. Practically, this can be achieved by dropping the cold, precured grit into an ascending column of hot gas. The residence time (t) of the particles in the gas column is given by:

$$t = \frac{H}{V_g - V_s}$$

where: H is the height of the gas column $V_g$ is the mean upward velocity of the gas in the column $V_s$ is the ultimate free fall velocity of the particles with respect to the gas. When $V_g = V_s$, the particles do not fall but remain still with respect to the column walls. Since the size of the particles is small, their free fall maximum velocity is low and the gas column velocity required is also low. Generally speaking, smaller particles will fall more slowly and larger particles will fall faster.

Figure 2:
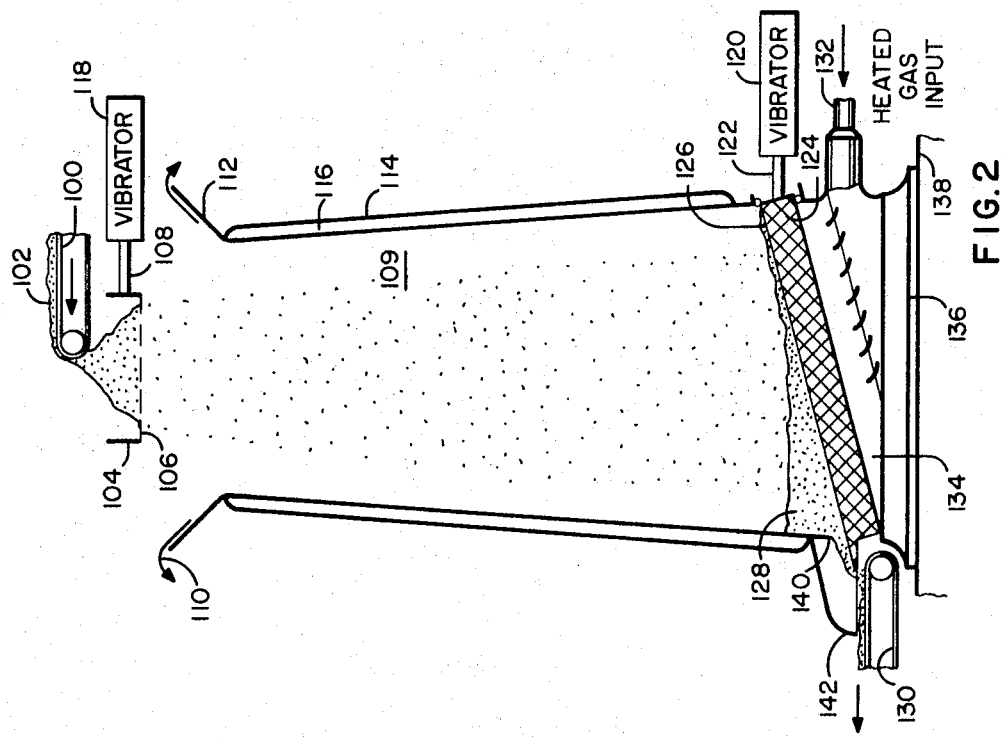
FIG. 2 is a schematic view of a gaseous bed curing process apparatus.

Referring to FIG. 2, the cold, nonspherical particles or grits 102 are introduced at the top of a heated gas column 109 by a known conveyor belt apparatus 100. The particles 102 are deposited on a shaker 104 having a screen 106, both of which are vibrated by a vibrator 118 through connection 108. The shaker screen 106 functions to provide uniform dispersion of the particles 106 in the rising gas column 109. A gas column housing 112 forms a flue that is supplied with heated gas from a gas heater 132. The heated gas passes through expansion space 134, through porous plate 124, through the settled and cured particles 128, up the column 112 and out the opening at the top in the direction of arrows 110. The cured particles 128 collect on the porous plate 126 and are vibrated by vibrator 120 through linkage 122 to flow down onto the conveyor belt 130. A cooling jacket 114 for carrying cooling gas or fluid in space 116 is provided for a purpose that will be explained hereinafter. The entire structure rests on base members 136 and 138.

The particles 102 are heated very rapidly, because of their small size and melt as they start falling in the hot gas and start curing. In the liquid state, the particles spheroidize for the reason given earlier and, as they keep curing, harden to the point that they are tack free. At that time the particles may touch without agglomerating and the rest of the curing process can be performed during the remainder of the fall. The cured particles are then cooled in step 30 and sorted by size range in step 34 to obtain the correct size of particles desired.

In the situation where particles 128 are of the correct size but have not been completely cured, then these particles are taken out at line 37 and reintroduced at the spheroidization step 24 for further processing at curing temperature to complete the resin curing process. The "additional polymers" type, such as epoxies, would usually be cured in one pass through the gas column 109 while the "condensation polymers" type such as polybenzimidazole, polyimide or polyquinoxaline resins, would be more likely to require reprocessing. In all cases, the gas used should be such that it does not react with the particle materials, before and during curing. The gas pressure is set to that amount required to correctly control the free fall maximum velocity of the particles and the heat transfer rate between the gas and the particles. The choice between several suitable gases such as helium, nitrogen, carbon dioxide, or other suitable gases makes possible the adjusting of this free fall maximum velocity because of the large differences in gas density for given temperatures and pressures.

The gas temperature is high enough to melt the precured resin and also to cure the resin to the tack free stage as fast as possible. In order to keep liquid particles from sticking to the walls of the gas column, two features of the apparatus illustrated in FIG. 2 are used, either individually or in combination. The column cross section is smaller at the top and larger at the bottom giving an outward slope to the wall 112. The gas column wall 112 is also cooled so that a cooler gas boundary layer is maintained adjacent the wall. This keeps the liquid particles from touching the walls and a liquid particle in the cold gas boundary layer solidifies and becomes as tack free as it was in the precured stage.

LIQUID FLUID BED

The essential differences between the liquid bed and the preceding gas bed are that the rate of settling is much slower in a liquid than it is in a gas, the surface tension forces acting on the particle liquid interface are smaller than they are in the case of a gas and correspond to the difference between those due to the surface tension of the resin and those due to the surface tension of the bed liquid, and the liquid if not self removing must be removed from the particles in a washing and drying step.

In using a liquid bed, see FIG. 3, the loading, curing and unloading proceeds in the following manner. A suitable liquid 178 is placed in a liquid tight container 162. Heating jacket 164 provides a heating space 166 for containing hot gas or fluid from any suitable source (not shown) for heating the liquid 178 to the temperature required for melting and curing the particles. A connecting container 191 has a reservoir supply of liquid 192 therein that is used to maintain a given level of liquid 178 in the container 162. A suitable gas under pressure is applied through opening 190 to force the liquid 192 through connector 193 and into the container 162 to maintain the given level.

The particles to be shaped to a spheroid are transported on a conveyor 152 of known construction and deposited in a shaker 158 having a screen 160. A vibrator 154 is connected by linkage 156 to vibrate the shaker 158 and disperse the particle grits 150 evenly in the heated liquid 178. The particles when dusted on the free surface of the hot liquid 178 melt and start falling slowly in a spherical shape in the liquid and cure while settling. When enough particles have settled at the bottom of the liquid column 178, the drive motor 168 is energized to operate the helical screw extractor 172 to move the settled curred particles 174 to the container 191 where the particles pass out through opening 180 to a conveyor belt 182. The conveyor belt 182 may be made of a porous material that allows the liquid to pass therethrough into the sump 184, where the liquid is moved by a suitable line 186 and pump 188 to the chamber 191 to be added to the liquid 192. Suitable valves may be employed in line 186 to prevent the entry of back pressure gas from the gas pressure applied through opening 190 to the container 191. It should be understood that the extraction of the particles 174 at the bottom of the settlement without disturbing the upper part of the settlement allows the continuous automatic fabrication process to be accomplished by draining the excess liquid from the particles into the sump 184. Also suction or mechanical means can be used to more rapidly draw the particles and fluid from the opening 180. The pressure applied to the liquid 178 is relatively unimportant and could be anything practical such as atmospheric pressure.

Upon recovery of the particles from the fluid bed, the cured spheroid particles are then cooled and passed through a known washing and drying bed step 32 that functions to remove the fluid still on the particles from the fluid bed. The solvent used to remove the bed liquid, unless this liquid can be disposed of by evaporation process under heat and/or vacuum conditions, depends upon the nature of the fluid used in the bed liquid. The slurry of particles and liquid is mixed with the solvent and agitated to remove all liquid and the particles are then separated from the solvent either by known gravitational processes or through centrifugation settling. This can be repeated as many times as required to clean the particles adequately. Upon the last cleaning operation, the wet particles are dried by evaporation of the solvent and are then sorted out by size range as described relative to the process step 34 previously described.

It may thus be understood that the steps 24 through 32 may be accomplished either by using the gaseous bed or the liquid bed. However, the particles obtained in the sorting and classifying step 34 from either process are substantially the same. The dry cured particles obtained and sorted out in the sorting and classifying step 34 are then moved in any known type of container directly into an oven that is at a temperature required to drive all the volatile elements of the resin out and produce the char products desired, which holds the metallic compound powder together in a porous binder. The pressure applied to the particles during this pyrolyzation process is unimportant but the volatiles must be allowed to escape. This step completes the fabrication process of the uncoated porous particles. Upon final sorting out, if so desired, these particles are ready for the coating operation if a coating is desired.

As previously described, the particles or grits leaving the crushing step have a nonuniform shape that generally resembles gravel. There are certain uses for charred end particles having these shapes. Thus is a modification of this invention, the mixed composition mixed in step 10 is heated 52 to the curing temperature of the resin and is cured and cooled 54 to a solid form. The solid composition is crushed 56 to a grit form that generally resembles gravel and has a particle size that determines the size of the end porous graphite particle. The crushed particles or grits are sorted by screening techniques, with large size particles removed by course screening 58 and returned 66 to be recrushed in the crushing step 56. Smaller size particles are removed by fine screening 60 and if desired, are returned 62 to the mixing step 10 to increase operational yield. The sized particles or grits are then 64 pyrolyzed 38 in the manner previously described.

While I have shown and described a specific form of my invention, it is to be understood that various changes and modifications may be made without departing from the spirit of the invention as set forth in the appended claims.

Having described my invention, I now claim:

1. The process for the fabrication of spheroid porous graphite particles having powdered material of metal or metallic compounds dispersed therein comprising the steps of,
   mixing a powdered material of metal or metallic compounds with a resin,
   precuring the resin with the mixed material dispersed therein to a solid form,
   crushing the solid mixed material to particle grits having a given range of sizes,
   dispersing the grits in a fluid heated to the melting temperature of the resin forming spheroid particles,
   curing the resin in the spheroid particles,
   and charring the resin in the cured spheroid particles to a porous graphite binder.

2. The process for the fabrication of spheroid porous graphite particles having powdered material of metal or metallic compounds dispersed therein as claimed in claim 1 including the steps of,
   settling the cured spheroid particles in the heated fluid,
   and extracting the cured spheroid particles from the fluid.

3. The process for the fabrication of spheroid porous graphite particles having powdered material of metal or metallic compounds dispersed therein and having a given size as claimed in claim 2 including the step of,
   sorting the cured spheroid particles as to size.

4. The process for the fabrication of spheroid porous graphite particles having powdered material of metal or metallic compounds dispersed therein as claimed in claim 1 in which,
   the dispersing step including shaping the grits to a spheroid by surface tension forces,
   and dispersing the spheroid particles sufficiently in the fluid as to substantially prevent agglomeration of the particles until the resin in the particles is cured.

5. The process for the fabrication of spheroid porous graphite particles having powdered material of metal or metallic compounds dispersed therein as claimed in claim 4 in which,
   the dispersing and curing steps including dispersing the grits in a heated liquid bed,
   moving the spheroid particles through the liquid bed by gravity,
   curing the resin in the spheroid particles during the movement through the liquid bed,
   and removing the liquid from the cured spheroid particles.

6. The process for the fabrication of spheroid porous graphite particles having powdered material of metal or metallic compounds dispersed therein as claimed in claim 4 in which,
   the dispersing and curing steps including dispersing the grits in a heated gaseous bed, moving the spheroid particles through the gaseous bed by gravity, and moving the gas in the gaseous bed upwardly with sufficient force to reduce the speed of movement of the spheroid particles whereby the resin in the particles is cured during the movement.

7. The process for the fabrication of spheroid porous graphite particles having powdered material of metal or metallic compounds dispersed therein as claimed in claim 1 including the steps of, cooling the precured mixed material and resin, coarse screening the particle grits and returning large size grits to the crushing step, and fine screening the particle grits and returning small size particles to the mixing step.

8. The process for the fabrication of spheroid porous graphite particles having powdered material of metal or metallic compounds dispersed therein and having a given size as claimed in claim 1 including the step of, mixing carbon in the form of small particles with the powdered material and the resin.

9. The process for the fabrication of spheroid porous graphite particles having powdered material of metal or metallic compounds dispersed therein and having a given size as claimed in claim 8 in which, the mixed powdered material, resin and carbon having a volumetric ratio of 5 to 50 percent powdered material, 0 to 40 percent carbon and 10 to 95 percent resin.

10. The process for the fabrication of spheroid porous graphite particles having powdered material of metal or metallic compounds dispersed therein and having a given size as claimed in claim 1 in which, the resin comprising a resin that pyrolyzes from the cured solid state.

11. The process of fabrication of given size porous graphite particles having powdered material of metal or metallic compounds dispersed therein comprising the steps of, mixing a powdered material of metal or metallic compound with a resin, curing the resin with the mixed material dispersed therein to a solid form, crushing the solid mixed material to particle grits having a given range of sizes, and charring the resin in the cured grit to a porous graphite binder.

12. The process for the fabrication of given sized porous graphite particles having powdered material of metal or metallic compounds therein as claimed in claim 11 in which, the resin comprising a resin that pyrolyzes from the cured solid state, and mixing carbon in the form of small particles with the powdered material and the resin.

13. The process for the fabrication of given sized porous graphite particles having powdered material of metal or metallic compounds therein as claimed in claim 11 including the steps of, cooling the cured mixed material and resin, coarse screening the particle grits and returning large size grits to the crushing step, and fine screening the particle grits and returning small size grits to the mixing step.

* * * * *